United States Patent [19]
Tanijiri et al.

[11] Patent Number: 6,014,399
[45] Date of Patent: Jan. 11, 2000

[54] RESONANT OPTICAL DEVICE

[75] Inventors: Yasushi Tanijiri, Osakasayama; Hiroaki Ueda, Suita; Kenji Ishibashi, Izumi, all of Japan

[73] Assignee: Minolta Co., Ltd., Osaka, Japan

[21] Appl. No.: 09/215,313

[22] Filed: Dec. 18, 1998

[30] Foreign Application Priority Data

Dec. 24, 1997 [JP] Japan .................................. 9-354544

[51] Int. Cl.⁷ ...................................................... H01S 3/08
[52] U.S. Cl. .................................. 372/92; 372/6; 372/37; 372/99
[58] Field of Search ............................... 372/92, 98, 99, 372/6, 37

[56] References Cited

U.S. PATENT DOCUMENTS 5,557,444  9/1996  Melville et al. ........................ 359/199

FOREIGN PATENT DOCUMENTS 5-100175   4/1993   Japan .

*Primary Examiner*—Leon Scott, Jr.
*Attorney, Agent, or Firm*—Burns, Doane, Swecker & Mathis, LLP

[57] ABSTRACT

A resonant optical device has a rod-like resonator made of a fiber-reinforced resin for resonant vibration. A reflecting mirror is supported on the leading edge of the resonator. A drive unit oscillates the resonator in a circumferential direction. The base edge of the resonator is anchored to a stationary platform. The reflecting mirror is oscillated by a torsional oscillation produced by oscillation from the drive unit so as to scan light incident on the reflecting mirror. The resonator satisfies the expression $G/\rho \geq 12 \times 10^6$ Pa·kg⁻¹·m³, where the horizontal elastic modulus of the resonator is designated G, and the density is designated $\rho$. The resonator also satisfies the expression $\tau/G \geq 0.01$, where the torsional stress tolerance is designated $\tau$. In one embodiment, the fiber-reinforced resin is a carbon fiber-reinforced resin.

36 Claims, 15 Drawing Sheets

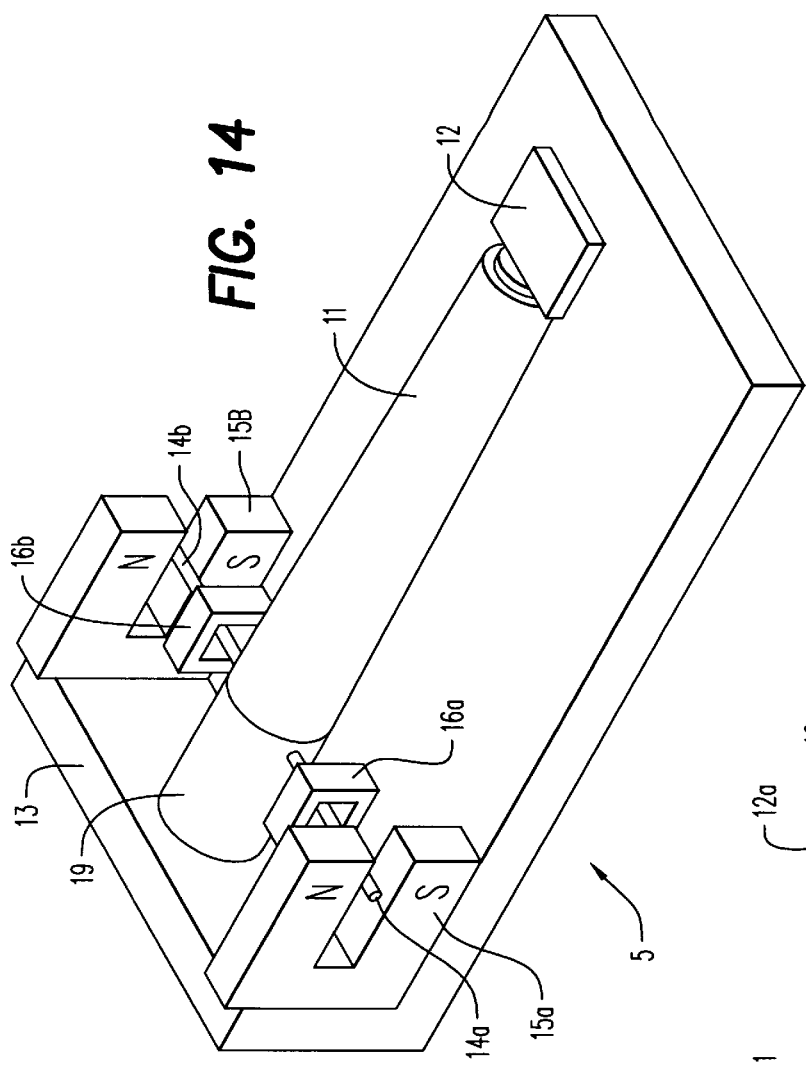
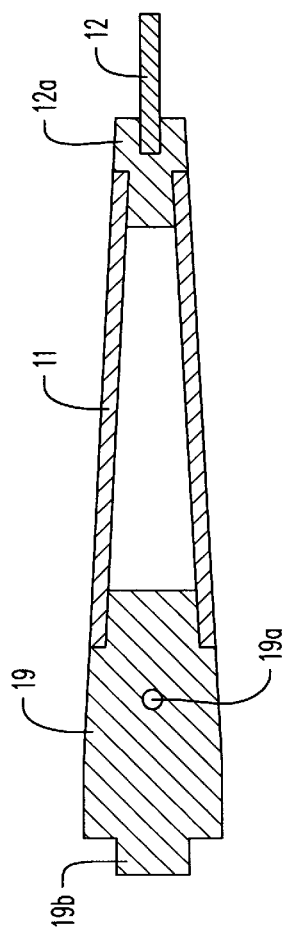
FIG. 14
FIG. 15

RESONANT OPTICAL DEVICE

BACKGROUND OF THE INVENTION

1. Field of the Invention

The present invention relates to an optical device for scanning light via a mirror, and more specifically relates to a resonant optical device for optical scanning at high speed by resonating a member supporting a mirror.

2. Description of the Related Art

Conventionally, optical scanning is accomplished by using a galvanometer to rotate a mirror. Since the galvanometer is mechanically driven by a motor and is provided with a reflective surface that characteristically scans light in a wide range, the overall construction including the drive mechanism is large and requires a large amount of energy to produce the drive force, thereby making it difficult to scan a wide range at high speed.

A resonant optical device has been developed which rotates a mirror at high speed using the resonance phenomenon. An example of a known resonant optical device is shown in FIG. 19. This resonant optical device comprises a rod-like iron resonator 51, reflecting mirror 52 mounted on the leading end of the resonator 51, stationary platform 53 to which the base end of resonator 51 is fixedly mounted, oscillators 54 formed of the same material as resonator 51 and protruding horizontally therefrom, permanent magnets 55a and 55b located above and below the ends of oscillators 54, and coils 56a and 56b through which the oscillators 54 pass. Magnets 55a and 55b, and coils 56a and 56b, are fixedly attached to platform 53.

The iron oscillators 54 are magnetized by a current supplied to coils 56a and 56b, and the current flow direction and wire winding direction of coils 56a and 56b are set so as to have mutually reverse polarities at opposite ends of oscillators 54. Magnets 55a and 55b have the polarities shown in the drawing, such that bilateral ends of the magnetized oscillators 54 receive a force in mutually opposite vertical directions. Therefore, oscillators 54 oscillate via an alternating current flowing through coils 56a and 56b so as to rotate rod-like resonator 51 around its axis.

Resonator 51 resonates with the oscillation of oscillators 54 so as to induce the oscillation of mirror 52 mounted on the tip of resonator 51, by matching the frequency of the alternating current oscillating the oscillators 54 to the natural frequency of the resonator 51. Since the base end of the resonator 51 is fixedly attached to platform 53, the oscillation amplitude (oscillation angle) of resonator 51 is greatest at the leading end, such that mirror 52 also oscillates with the same amplitude. Optical scanning is accomplished by changing the direction of reflection of incident light via the oscillation of mirror 52.

A transverse cross section of resonator 51 is shown in FIG. 20. Resonator 51 is formed so as to be thick at the base and tapered gradually toward the tip. A through hole 51a is formed near the base end, and a channel 51b is formed near the tip. Oscillator 54 is fixedly attached through the hole 51a, and reflecting mirror 52 is fixedly mounted in channel 51b so as to be gripped from both opposite sides.

The aforesaid resonant optical device is capable of optical scanning at high speed compared to a mechanically driven galvanometer, and can be constructed more compactly, thereby broadening its range of applications. For example, various proposals have recently been made for head-mounted displays (HMD) of the scanning type wherein light is directed to the retina and an image is projected by optical scanning on the retina, and resonant optical devices are suitable for the scanning units of such display devices due to their capability of high speed optical scanning and compactness. Resonant optical devices are desirable due to their greater breadth of scanning range and higher scanning speed.

In the case of a torsion spring of uniform thickness and having a mirror mounted on the tip and a fixed base, if the natural frequency is designated fn, the spring constant is designated k, moment of inertia of the mirror is designated I, and the moment of inertia of the spring itself is ignored, the natural frequency fn can be expressed by equation (1) below.

$$fn=1/(2\cdot\pi)\cdot(k/I)^{1/2}=1/(2\cdot\pi)\cdot\{(\pi\cdot G\cdot d^4)/(32\cdot I\cdot L)\}^{1/2} \quad (1)$$

where the value G represents horizontal elasticity, d represents the diameter of the spring, and L represents the length of the spring. Equation (1) shows that the natural frequency is proportional to the square of the spring diameter d, and inversely proportional to the square root of the spring length L. Increasing the spring diameter d and shortening the spring length L is effective in achieving high speed oscillation, i.e., increasing the natural frequency fn of the spring.

On the other hand, the spring amplitude limit $\theta$lim can be expressed by equation (2) below when the torsion stress tolerance is designated $\tau$.

$$\theta lim=2\cdot L\cdot\tau/(G\cdot d) \quad (2)$$

Equation (2) shows the amplitude limit $\theta$lim is proportional to the spring length L, and inversely proportional to the spring diameter d. Therefore, lengthening the spring length L and reducing the spring diameter d is effective in increasing the spring amplitude limit $\theta$lim.

As can be seen, the conditions which must be satisfied to increase the natural frequency fn and the conditions which must be satisfied to increase the amplitude limit $\theta$lim are mutually contradictory, relative to the size of the spring. Under this limitation, the conventional resonator shown in FIG. 20 is shaped so as to be gradually tapered from the base toward the tip to increase the natural frequency fn as well as increase the amplitude limit $\theta$lim. However, there is a natural limitation to increasing the natural frequency fn and amplitude limit $\theta$lim simply by the shape and size of the spring.

When considering the moment of inertia of the torsion spring itself, the natural frequency fn is expressed by equation (3) below.

$$\tan\{2\cdot\pi\cdot fn\cdot L/(G/\rho)^{1/2}\}=d^4\cdot(\rho\cdot G)^{1/2}/(64\cdot I\cdot fn) \quad (3)$$

where $\rho$ represents the density of the spring. Equation (3) not only expresses factors stipulating spring diameter d, spring length L, and modulus of transverse elasticity G, but also density $\rho$, and natural frequency fn.

SUMMARY OF THE INVENTION

An object of the present invention is to provide a resonant optical device capable of optically scanning a broad range at high speed while considering the characteristics of a torsion spring arising from not only size and shape but also material qualities.

These objects are attained by providing a resonant optical device comprising a rod-like resonator for resonating to vibration, a reflecting mirror supported on the leading edge of the resonator, a drive unit for oscillating the resonator in a circumferential direction, and a stationary platform, wherein the base edge of the resonator is anchored to the platform and the reflecting mirror is oscillated by a torsional oscillation produced by resonance of the resonator via oscillation from the drive unit so as to scan light incident on the reflecting mirror, and wherein the resonator satisfies the expression $$G/\rho \geq 12 \times 10^6 \quad (4)$$

when the horizontal elastic modulus of the resonator is designated G, and the density is designated $\rho$, and units of measurement are $Pa \cdot kg^{-1} \cdot m^3$.

When the value $G/\rho$ is set in a range so as to be large, according to equation (3) the natural frequency fn increases and the reflecting mirror can be oscillated at high speed. This range exceeds the value $G/\rho$ of metal materials such as iron and the like, which are used to form conventional resonant optical devices. Increasing the value $G/\rho$ can be achieved by increasing the modulus of transverse elasticity while maintaining a uniform density $\rho$, or by reducing the density $\rho$ while maintaining a constant modulus of transverse elasticity, and the latter case does not affect the amplitude limit $\theta$lim stipulated in equation (2).

These objects are further attained by providing a resonant optical device comprising a rod-like resonator for resonating to vibration, a reflecting mirror supported on the leading edge of the resonator, a drive unit for oscillating the resonator in a circumferential direction, and a stationary platform, wherein the base edge of the resonator is anchored to the platform and the reflecting mirror is oscillated by a torsional oscillation produced by resonance of the resonator via oscillation from the drive unit so as to scan light incident on the reflecting mirror, and wherein the resonator satisfies the expression $$\tau/G \geq 0.01 \quad (5)$$

when the horizontal elastic modulus of the resonator is designated G, and the torsional stress tolerance is designated $\tau$, and $\tau/G$ is a dimensionless number because the physical quantities of $\tau$ and G have the same dimension.

When the range is set to increase the value of $\tau/G$, according to equation (2) the resonator frequency limit $\theta$lim can be increased to oscillate the reflecting mirror at a high amplitude without damaging the resonator. This range exceeds the value $\tau/G$ of metal materials such as iron and the like, and provides a resonant optical device having an amplitude limit greater than a conventional device.

The resonator may be a torsion spring reinforced in the circumferential direction by fibers formed of fiber reinforced resin. Equation (4) can be readily satisfied since the modulus of transverse elasticity equals or exceeds that of metal by reinforcement in a direction to which force is applied, and because the resin is less dense. Furthermore, since it is possible to set various characteristics even among fiber-reinforced resins of similar types, it is easy to select resins having a modulus of transverse elasticity and torsion stress tolerance which satisfy equation (5). The resonator even may be hollow, thereby reducing the moment of inertia of the resonator itself, and increasing the natural frequency even more.

Carbon fiber-reinforced resin may be used as the fiber-reinforced resin. Since such resins have small density and their modulus of transverse elasticity and torsion stress tolerance can be readily increased, these resins satisfy equations (4) and (5).

BRIEF DESCRIPTION OF THE DRAWINGS

FIG. 14 is a perspective view showing the exterior of the resonant optical device of a fifth embodiment;

FIG. 15 is a section view of the oscillator, resonator, and reflecting mirror;

DETAILED DESCRIPTION OF PREFERRED EMBODIMENTS

Preferred embodiments of the resonant optical device of the present invention are described hereinafter with reference to the accompanying drawings. The resonator of the resonant optical device of the present invention may be formed of fiber-reinforced resins such as carbon fiber reinforced plastic (CFRP), glass fiber-reinforced plastic (GFRP), boron fiber-reinforced plastic (BFRP) and the like. CFRP is used in each of the embodiments described below. The characteristics of the torsion spring are first described below.

Figure 1:
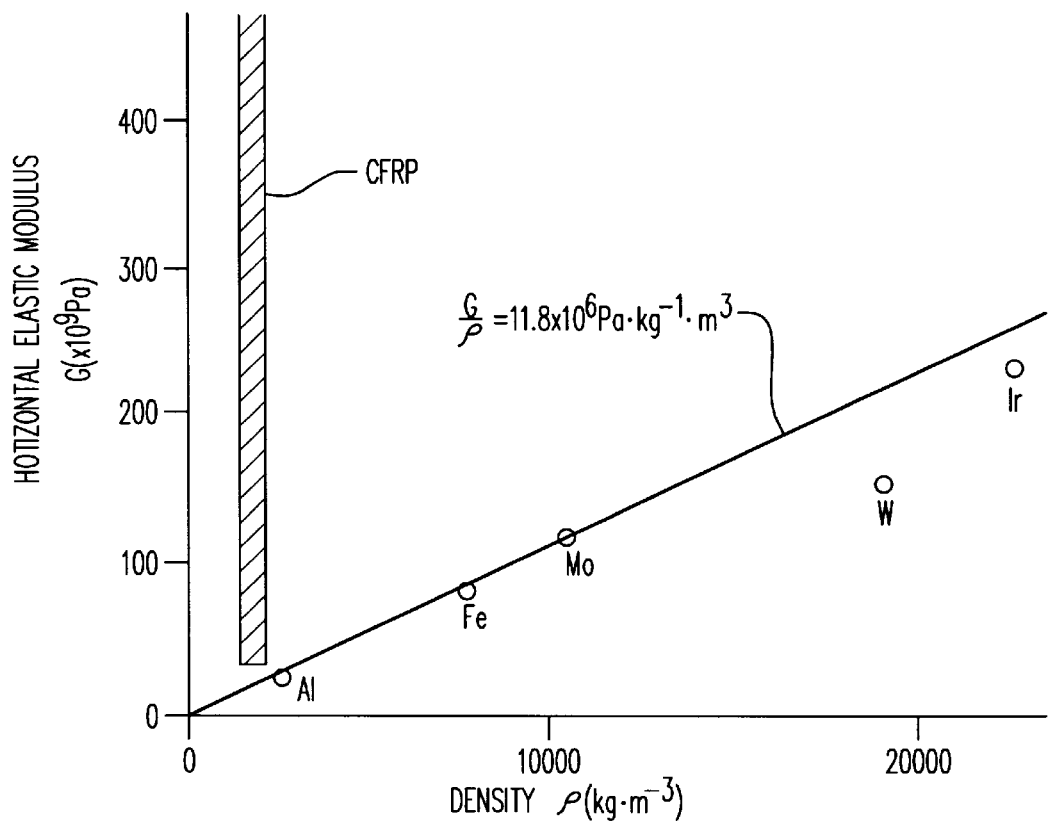
FIG. 1 shows the correspondence between the modulus of transverse elasticity and density of metal and carbon fiber-reinforced resin.

FIG. 1 shows the relationship between modulus of transverse elasticity and the density $\rho$ of CFRP. FIG. 1 shows a number of examples of moduli of transverse elasticity and densities of metal for comparison of conventional spring materials. In general, metals have a tendency of increasing modulus of elasticity in proportion to increasing density corresponding to a 1:1 ratio of density $\rho$ to modulus of transverse elasticity G. For example, the densities $\rho$ of aluminum (Al), iron (Fe), molybdenum (Mo), Tungsten (W), and iridium (Ir) increase sequentially, and their modulus of transverse elasticity also increase linearly. Molybdenum has the largest value $G/\rho$ among the metals shown in the chart; the value of $G/\rho$ is $11.8\times10^6$ pa·kg$^{-1}$·m$^3$, and is represented by the sloped solid line.

In contrast, the density $\rho$ of CFRP remains nearly constant while the modulus of transverse elasticity varies in accordance with carbon fiber content, characteristics, and orientation. Specifically, density $\rho$ is about $1.3\times10^3 \sim 2.2\times10^3$ kg·m$^{-3}$, whereas the density $\rho$ of aluminum is greater at $2.7\times10^3$ kg·m$^{-3}$. The modulus of transverse elasticity G covers an extremely wide range of $30\times10^9 \sim 500\times10^9$ Pa and higher, and often exceeds the value G of $230\times10^9$ Pa of iridium which has a density of $22\times10^3$ kg·m$^{-3}$. The value $G/\rho$ of CFRP is $12\times10^6$ Pa·kg$^{-1}$·m$^3$ and higher, which is greater than that of molybdenum and iron.

Figure 2:
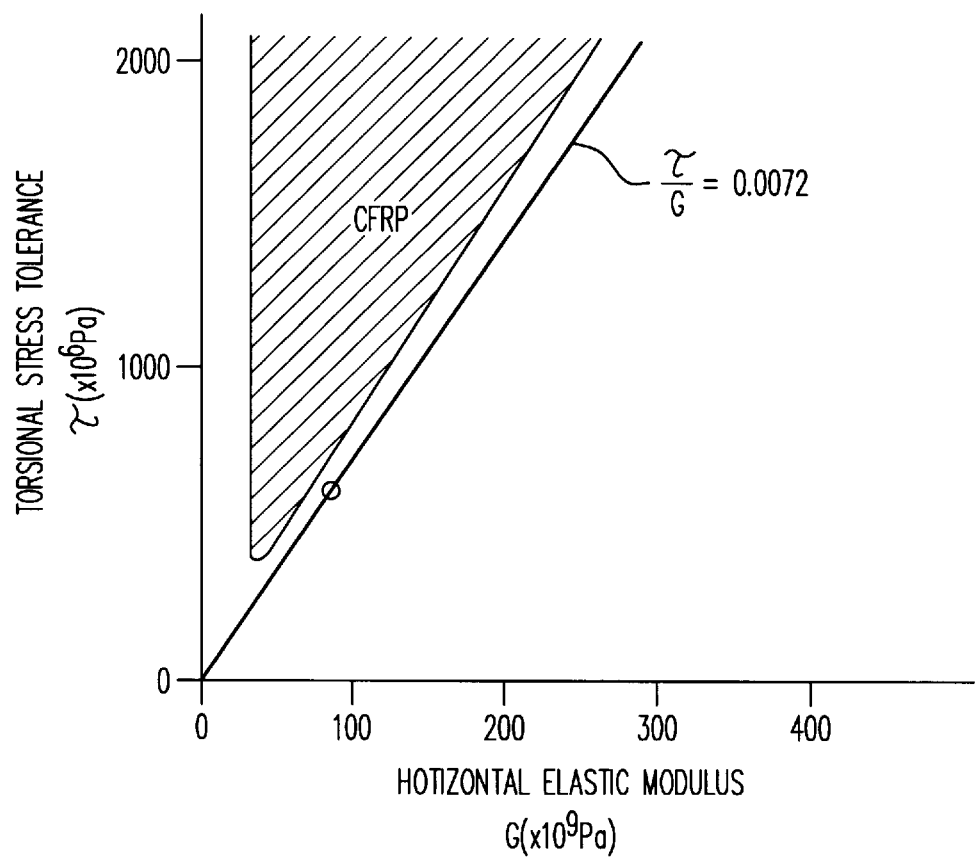
FIG. 2 shows the correspondence between the modulus of transverse elasticity and torsional stress tolerance of metal and carbon fiber-reinforced resin.

FIG. 2 shows the correspondence between the modulus of transverse elasticity G and torsional stress tolerance $\tau$ of CFRP. In FIG. 2, hardened steel (Fe) which has the broadest use as a torsion spring material is shown for comparison purposes of a conventional spring material. Iron has a modulus of transverse elasticity G of $83\times10^9$ Pa, and torsional stress tolerance $\tau$ of $600\times10^6$ Pa; the $\tau/G$ value is 0.0072. Since, in general, the stress tolerance of metal is proportional to the modulus of elasticity, there is not a large difference in the $\tau/G$ value of other metals such as molybdenum and iridium.

On the other hand, the torsional stress tolerance $\tau$ of CFRP varies in accordance with carbon fiber content, characteristics, and orientation similar to the modulus of transverse elasticity. For example, while the modulus of transverse elasticity G is $30\times10^9$ Pa and higher, the torsional stress tolerance $\tau$ is in the range of $370\times10^6 \sim 2,000\times10^6$ Pa and higher. Furthermore, the lowest value of torsional stress tolerance $\tau$ increases in conjunction with an increase in the modulus of transverse elasticity G. The value $\tau/G$ of CFRP is easily 0.01 and higher.

A resonator formed of CFRP having a $G/\rho$ value of $12\times10^6$ Pa·kg$^{-1}$·m$^3$ and higher with a $\tau/G$ value of 0.01 and higher has a greater natural frequency fn and greater amplitude limit $\theta$lim than conventional metal resonators, and oscillates at higher frequency and has larger oscillation at the same size and shape as a conventional resonator. The resonator of the various embodiments satisfy this condition. GFRP, BFRP and other fiber-reinforced resins have characteristics similar to CFRP, and also satisfy the aforesaid condition.

Figure 3:
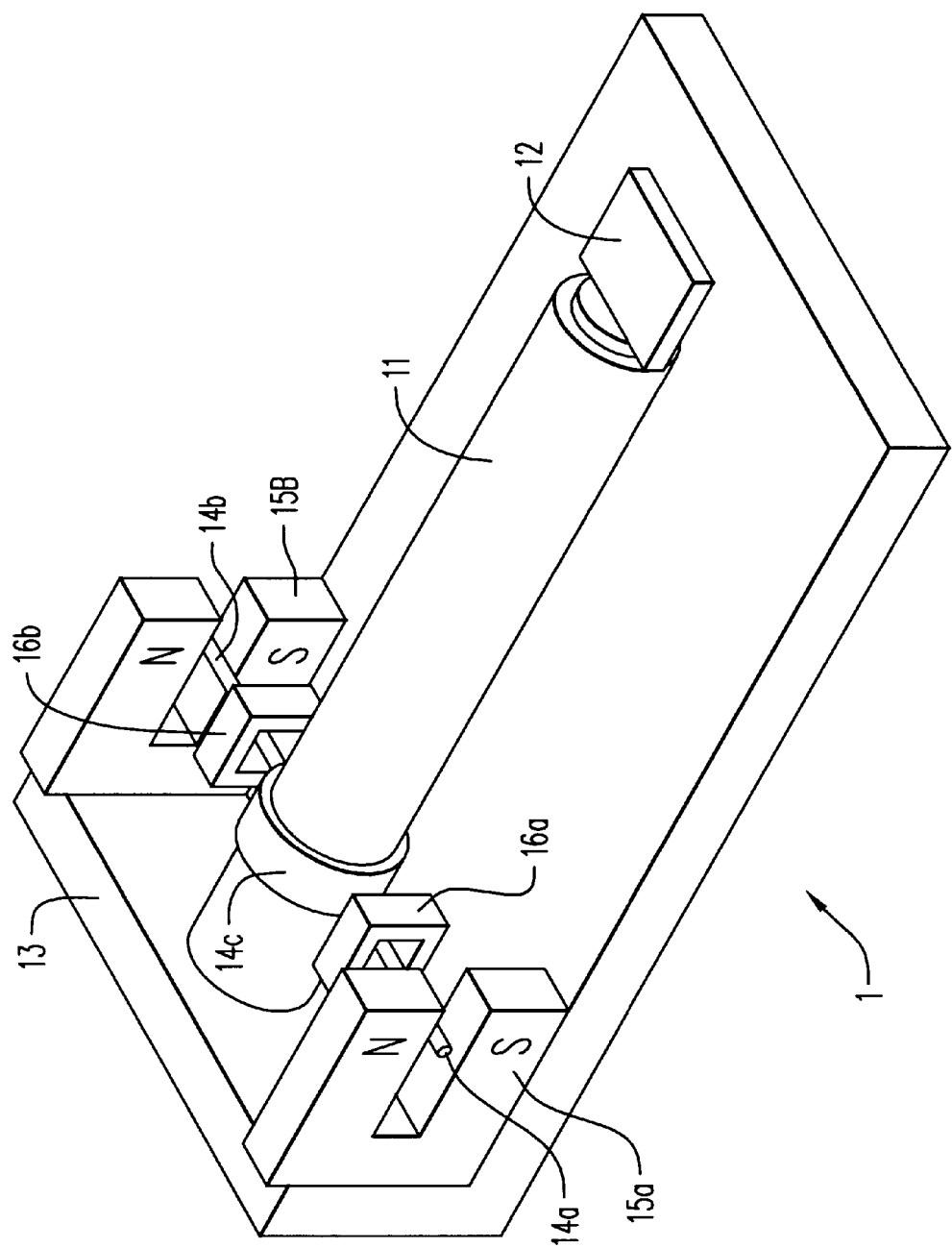
FIG. 3 is a perspective view of the exterior of a first embodiment of the resonant optical device.

FIG. 3 is an exterior view of a first embodiment of a resonant optical device. Resonant optical device 1 comprises a rod-like resonator 11 formed of CFRP, reflecting mirror 12 held on the tip of resonator 11, base 13 to which is fixedly mounted the base end of resonator 11, small rod-like oscillators 14a and 14b mounted with a horizontal orientation on resonator 11, permanent magnets 15a and 15b circumscribing the end portion of oscillators 14a and 14b from above and below, and coils 16a and 16b through which extend oscillators 14a and 14b, respectively.

Figure 19:
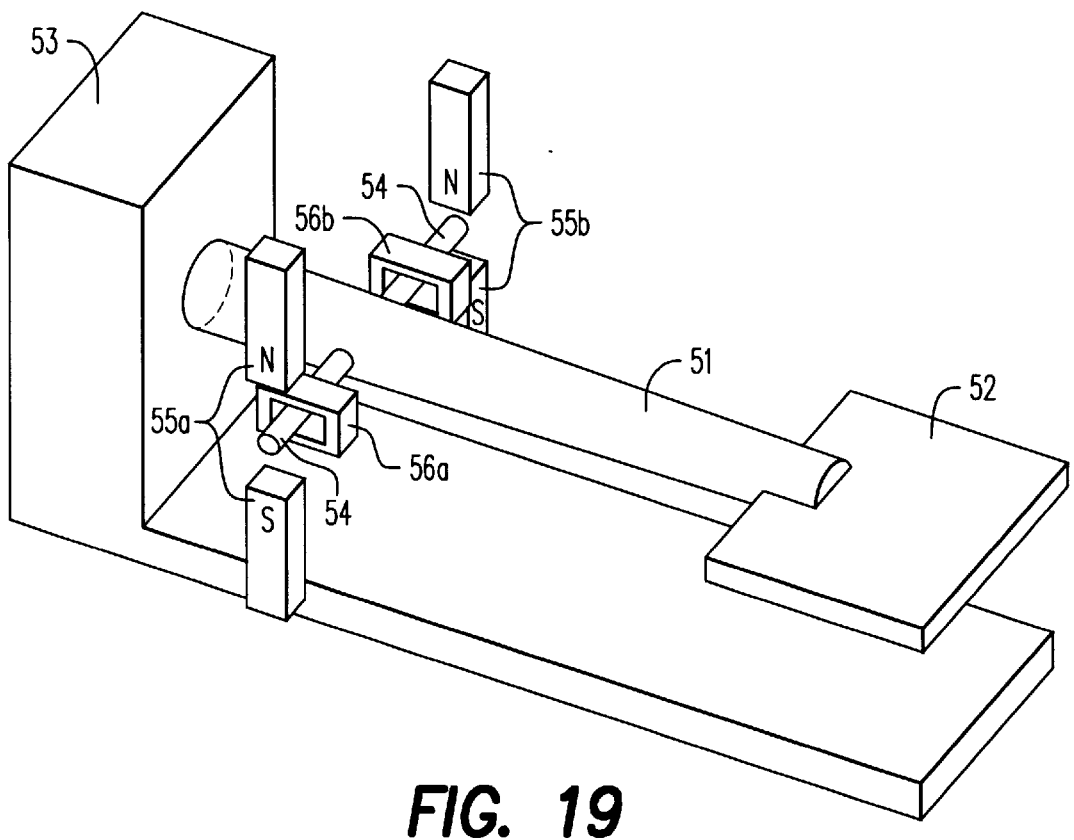
FIG. 19 is a perspective view showing the exterior of a conventional resonant optical device.
Figure 20:
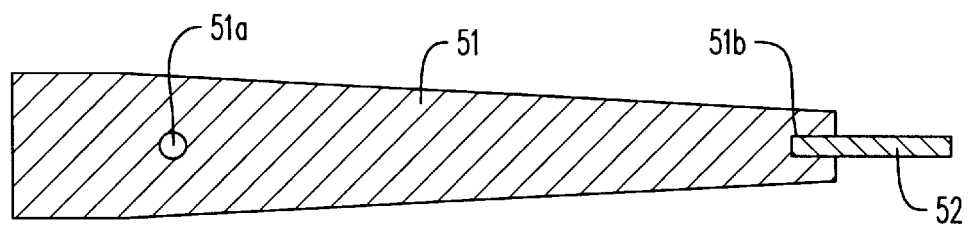
FIG. 20 is a section view of a conventional resonator.

Magnets 15a and 15b and coils 16a and 16b are fixedly attached to base 13, so as to be separated from oscillators 14a and 14b. Oscillators 14a and 14b are formed of magnetic material such as iron or the like, and are attached to the exterior of resonator 11 via ring 14c formed of identical material. The operating principle of the resonant optical device 1 is identical to that of the conventional device shown in FIG. 19, and therefore is not discussed further.

Resonator 11 is cylindrical in shape and hollow from base to tip. As previously mentioned, resonator 11 has both a large natural frequency fn and large amplitude limit $\theta$lim due to the characteristics of the constituent material, and the hollowness of the member reduces the moment of inertia as well as increases the natural frequency fn.

Figure 4:
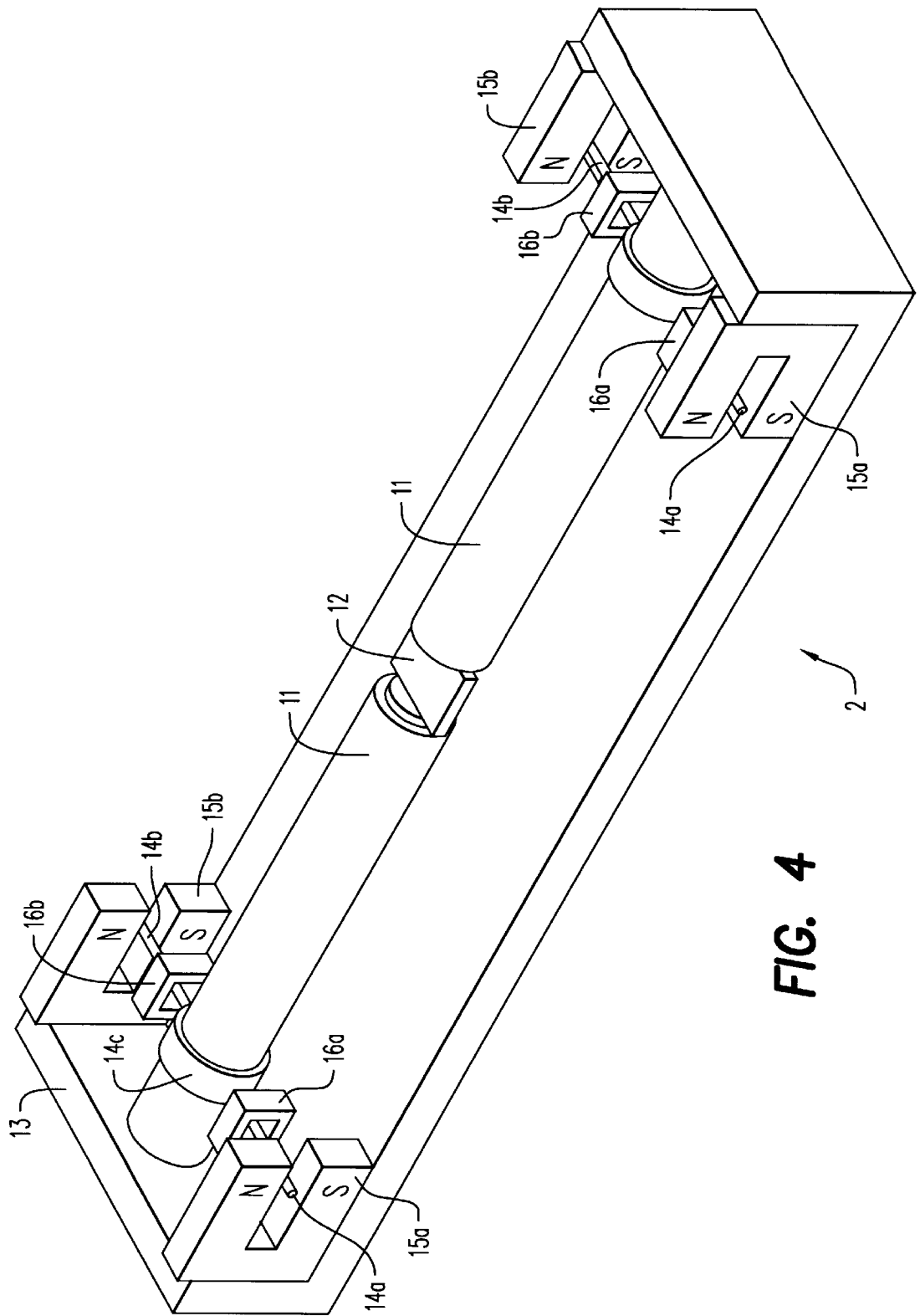
FIG. 4 is a perspective view of the exterior of a second embodiment of the resonant optical device.

FIG. 4 is an external view of resonant optical device 2 of a second embodiment. Resonant optical device 2 contains a single reflecting mirror 12, and two resonators 11 at bilateral ends. The respective resonators 11 are provided with oscillators 14a and 14b, and each is provided with drive magnets 15a and 15b and coils 16a and 16b. The spring constant is about double that when using a single resonator 11, and the natural frequency fn is about 1.4 (square root), thereby allowing optical scanning at higher speed.

Figure 5:
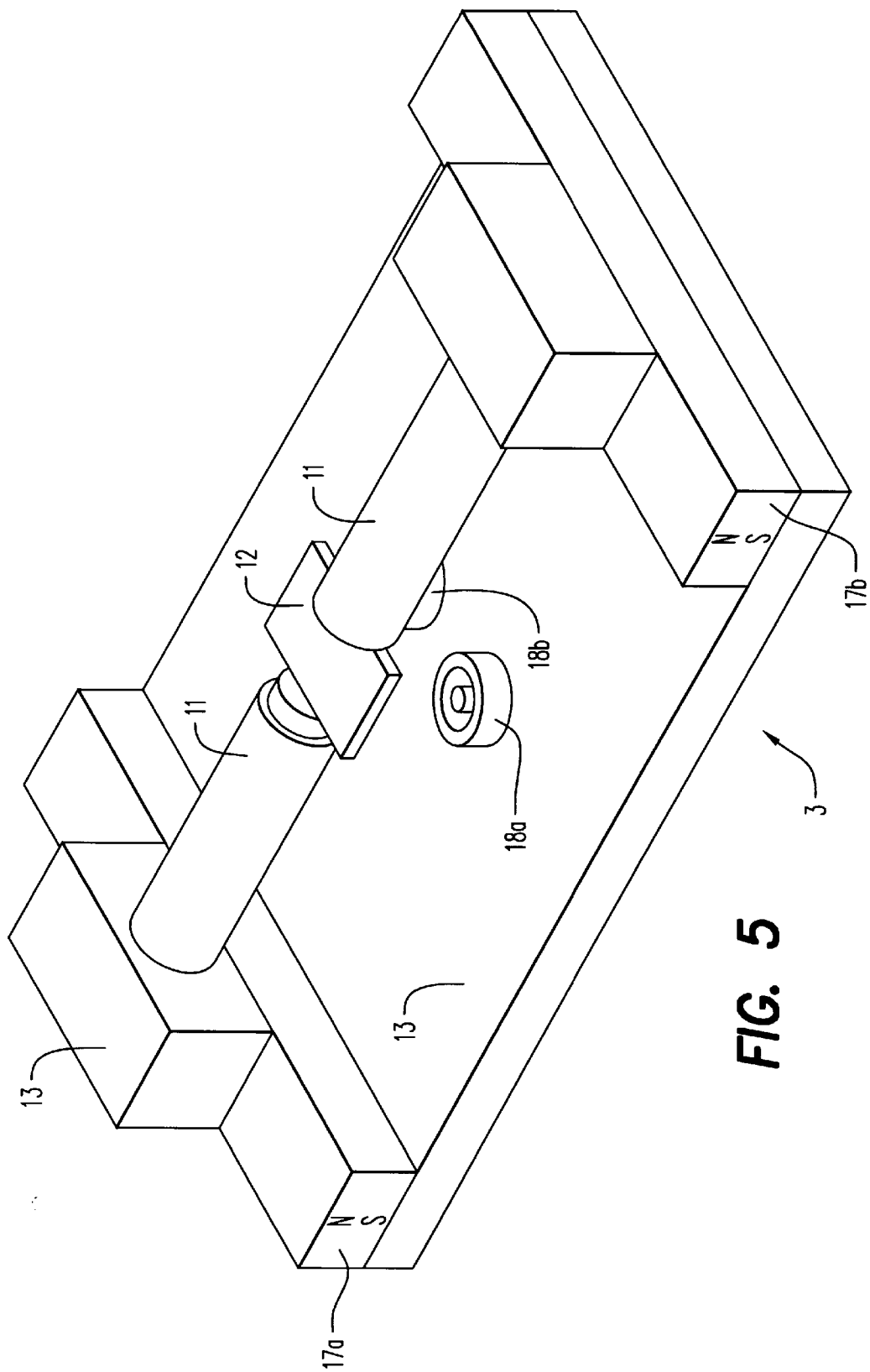
FIG. 5 is a perspective view of the exterior of a third embodiment of the resonant optical device.

FIG. 5 shows resonant optical device 3 of a third embodiment. Resonant optical device 3 has a single reflecting mirror 12 maintained by two resonators 11 on bilateral ends similar to the aforesaid resonant optical device 2, but has a different construction to oscillate resonator 11. Resonant optical device 3 is provided with two permanent magnets 17a and 17b and two coils 18a and 18b, and the base end of resonators 11 are fixedly mounted at the top of magnets 17a and 17b which form part of the base 13.

The polarities of the two magnets 17a and 17b are set in the same direction vertically as shown in the drawing. A magnetic body of iron oxide or the like is continuously applied to the surface of each component from the bottom surface of reflecting mirror 12 to magnets 17a and 17b, such that the magnetic force of magnets 17a and 17b is transmitted to the underside of mirror 12.

Coils 18a and 18b are positioned in a direction perpendicular to the axis of resonator 11. The winding direction and current flow direction of coils 18a and 18b are set so as to produce mutually opposite electric fields in a vertical direction, so as to exert forces to push up on one side of mirror 12 and pull down on the other side of mirror 12. Accordingly, mirror 12 oscillates around the axis of the two resonators 11 via an alternating current flowing through the coils 18a and 18b. That is, in resonant optical device 3 mirror 12 functions as an oscillating element.

Figure 6:
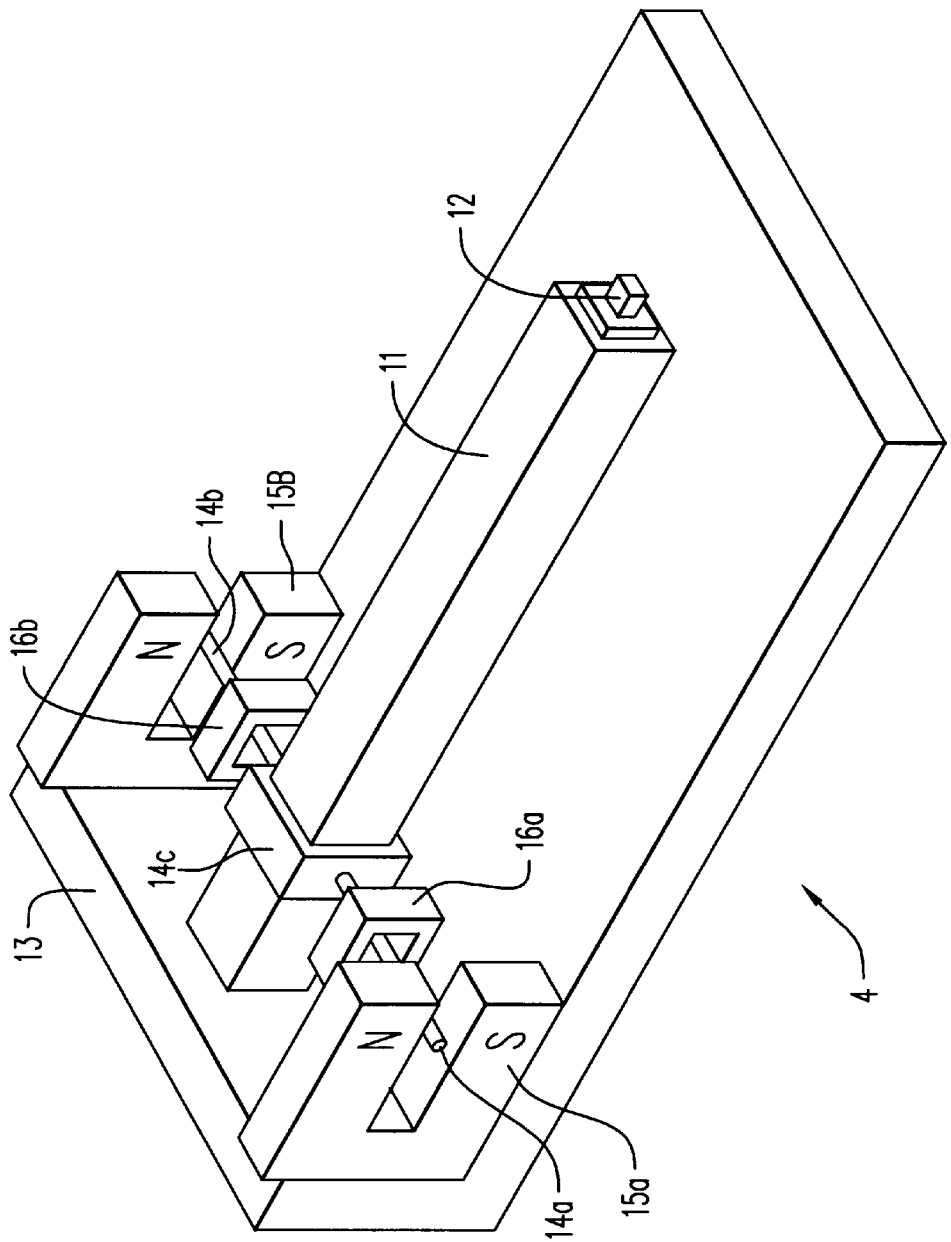
FIG. 6 is a perspective view of the exterior of a fourth embodiment of the resonant optical device.

FIG. 6 is an exterior view of resonant optical device 4 of a fourth embodiment. Resonant optical device 4 differs from the resonant optical device 1 of the first embodiment in that the shape of the resonator 11 is a quadrangular column. This resonator 11 is also hollow, and the interior cavity is also squared. Although the example shows the mounting of a small square reflecting mirror, a larger reflecting mirror may be used.

Figure 7:
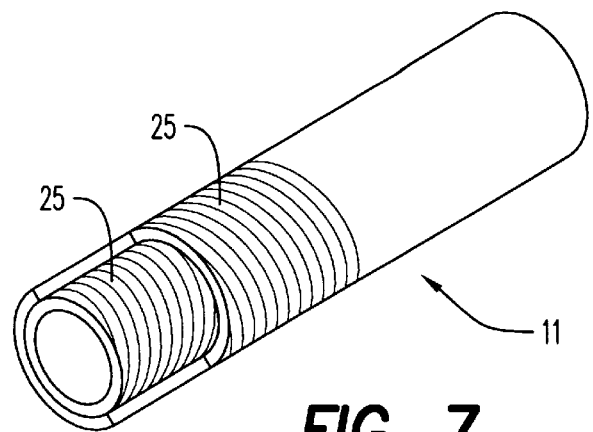
FIG. 7 is a cutaway perspective view showing the structure of the resonator.

FIG. 7 shows the structure of the resonator 11 of resonant optical devices 1~3 of the first through third embodiments. Carbon fiber 25 is wrapped in overlapping spiral configuration at an inclination of about +45° and about −45° relative to the center axis of the tube. Resonator 51 is reinforced in the torsion oscillation direction via the arrangement of carbon fibers 25 in the circumferential direction of the tube. The torsion force acting on resonator 51 becomes the force pulling the carbon fibers, but since the modulus of longitudinal elasticity of the carbon fiber is about $1\times10^{11} \sim 8\times10^{11}$ Pa and the pull stress tolerance is $1\times10^9$ Pa or greater, the value G/ρ and value τ/G can be readily set to satisfy the previously mentioned conditions.

The magnitude of the inclination of the carbon fibers relative to the center axis of the tube is optional, and may be, for example, perpendicular to the circumference or may have variable inclinations for each multiple layer. When the magnitude of the inclination of the carbon fiber is increased relative to the center axis of the tube so as to approach the perpendicular, there is an increase in strength in the circumferential direction, whereas when the inclination of the carbon fiber is reduced so as to approach the parallel, there is an increase in the degree of strength in the axial direction.

The tubular resonator 11 is formed by wrapping carbon fibers 25 on a temporary cylindrical core and adding molten resin, and extracting the temporary core member after the resin has hardened. Alternatively, the temporary core member may be eliminated by dissolving. If a multi-sided temporary core member is used, a multi-sided tube-like resonator may be formed; this method was used to produce the resonator used in the resonant optical device 4 of the fourth embodiment.

As an alternative to using a temporary core member of uniform thickness, a temporary core member which is gradually tapered from one end toward an opposite end may be used so as to produce a resonator having a thick base end attached to base 13 and a thin tip to which is attached reflecting mirror 12. A resonator of this configuration has a reduced moment of inertia and an even higher natural frequency fn.

The resonator may also be produced using a multi-sided temporary core member having a cylindrical center section, a multi-sided column thicker than said center section at one end, and a multi-sided column thinner than said center section at an opposite end. The temporary core member may be removed by pulling it from the end of the thicker side. The external shape of the resulting resonator may be cylindrical with the interior surfaces at bilateral ends being non-cylindrical so as to accurately connect to reflecting mirror 12 and base 13 as described below.

Figure 8A:
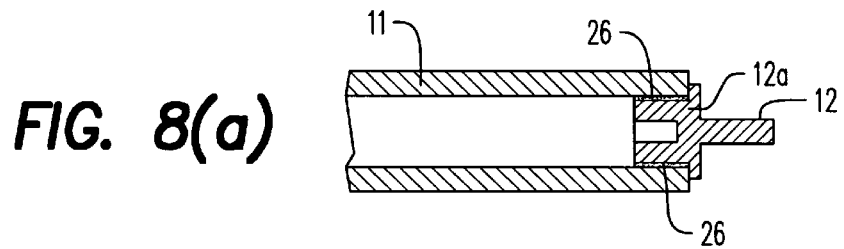
FIGS. 8a–8c are a section view showing an example of the connection of the resonator and the reflecting mirror.
Figure 8B:
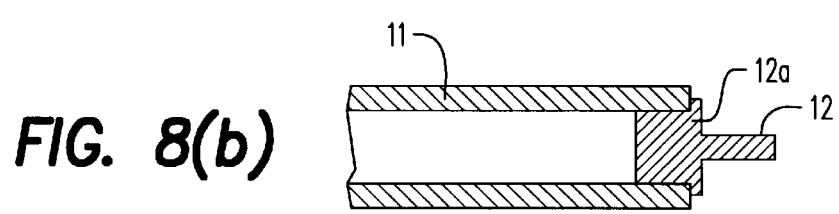
Figure 8C:
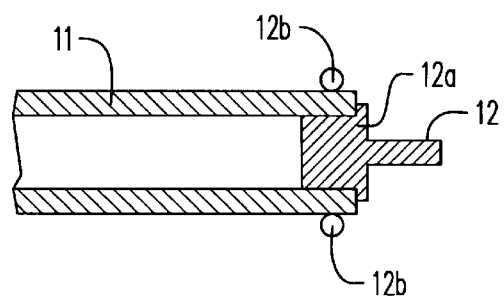

The connection between resonator 11 and reflecting mirror 12 is described below. FIG. 8 shows an example of resonator 11 and mirror 12 in a connected state. FIG. 8(a) shows a connector 12a formed integrally on mirror 12, and this connector 12a is inserted into the tip of resonator 11, and adhered to the interior surface via an adhesive 26. FIG. 8(b) shows the major diameter of connector 12a formed so as to be slightly larger than the interior diameter of the tip of resonator 11, such that both members are engaged by pressing connector 12a into the tip of resonator 11. FIG. 8(c) shows the tip of resonator 11 with connector 12a press-fitted thereon and fixedly attached by tightening ring 12b on the exterior side.

Hard-fastening the resonator 11 and mirror 12 completely prevents movement of the mirror 12 in the direction of oscillation relative to the tip of resonator 11, and oscillates mirror 12 at the same frequency and amplitude as the top of resonator 11. If the interior surface of the tip of resonator 11 is a quadrangular columnar surface and the connector 12a has a complementary shape, a more accurate connection is made without slipping in the oscillation direction.

Figure 9A:
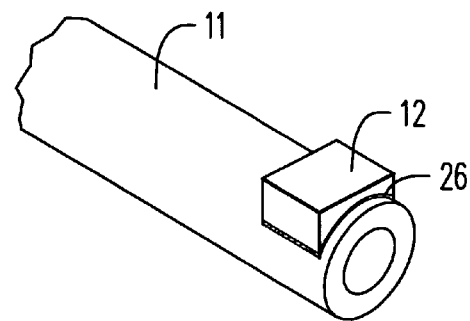
FIGS. 9a and 9b are a section view showing another example of the connection of the resonator and the reflecting mirror.
Figure 9B:
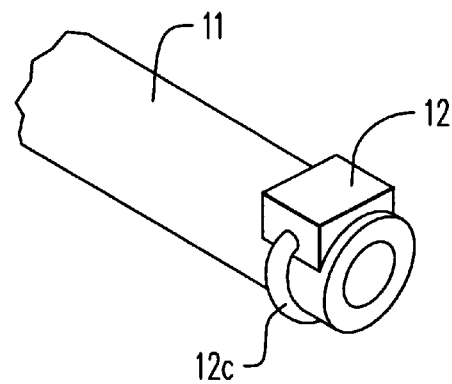

FIG. 9 is an external view of another example of the connection between resonator 11 and mirror 12. FIG. 9(a) shows the back side of mirror 12 formed as a concavity having a curve identical to the exterior surface of resonator 11, and fixedly attached thereto via adhesive 26. FIG. 9(b) shows mirror 12 fixedly attached to the exterior surface of resonator 11 via a ring or collar 12c tightened at the tip of resonator 11.

Figure 10:
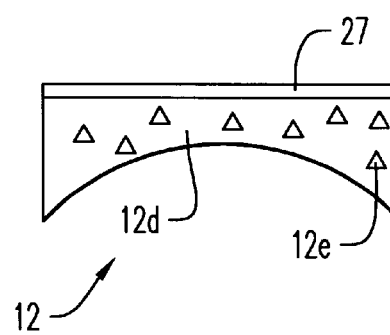
FIG. 10 is a section view showing an example of the structure of the reflecting mirror.

The structure of mirror 12 used above is shown in FIG. 10. Mirror 12 is formed of glass reinforced by crystallized glass 12e mixed with amorphous glass 12d, with a coating of a reflective agent 27 on the surface thereof. The reinforced glass is difficult to distort via external force and does not bend even when oscillated at high speed, thereby obviating any concern of loss of optical characteristics.

Figure 11A:
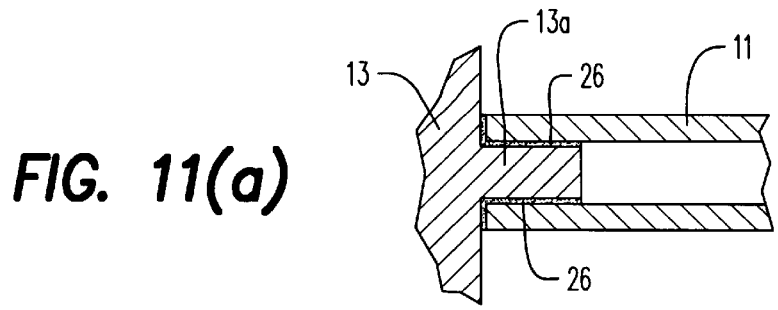
FIGS. 11a–11d are a section view showing an example of the connection of the resonator and base.
Figure 11B:
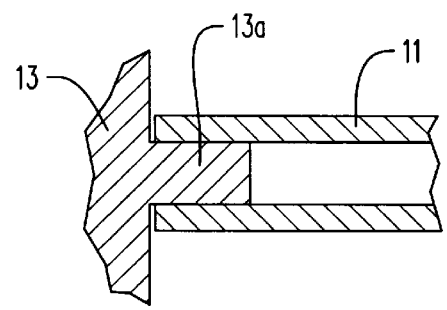
Figure 11C:
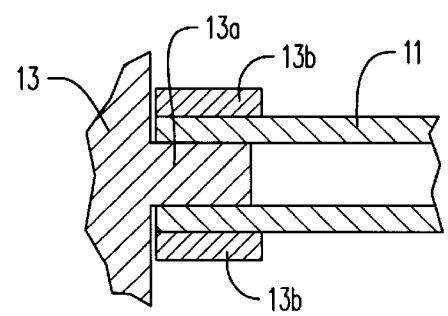

The connection between resonator 11 and base 13 is described below. FIG. 11 shows examples of the cross section of resonator 11 and base 13 in the connected state. FIG. 11(a) shows a protruding connector 13a formed beforehand on base 13, with said connector 13a inserted into the base end of resonator 11 and adhered to the interior surface thereof via adhesive 26. FIG. 11(b) shows the major diameter of connector 13a formed so as to be slightly larger than the interior diameter of the base of resonator 11, such that both members are engaged by pressing connector 13a into the tip of resonator 11. FIG. 11(c) shows the base of resonator 11 with connector 13a press-fitted therein and fixedly attached by tightening ring 13b on the exterior side.

Figure 11D:
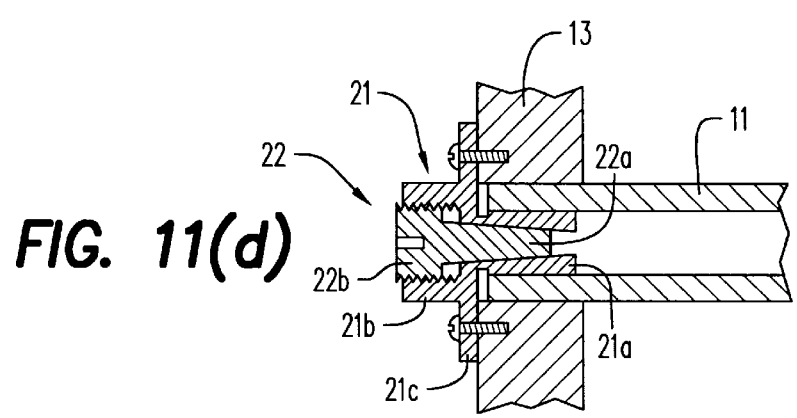
Figure 12:
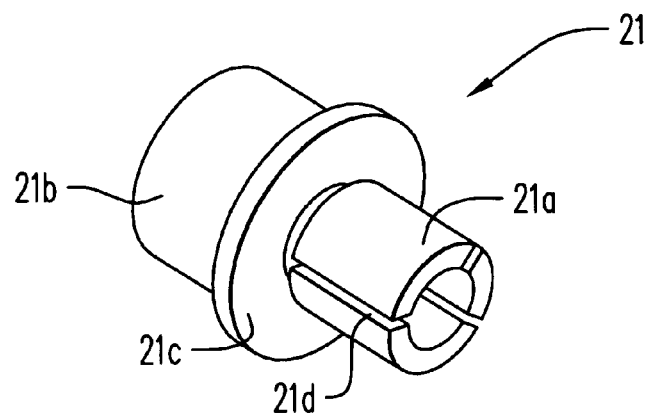
FIG. 12 is a perspective view showing connector for connecting the resonator and base.

FIG. 11(d) shows a through hole having a diameter slightly smaller than the major diameter of the base end of resonator 11 formed beforehand, and a connector 21 inserted into the base end of resonator 11 and press-fitted thereto via said through hole, with said connector 21 being fixedly attached thereto via pressure from the interior side of resonator 11 using a supplemental connector member 22. FIG. 12 shows an exterior view of connector 21. Connector 21 comprises a forepart 21a for inserting into resonator 11, flange 21c parallel to the back surface of base 13, and afterpart 21b. Forepart 21a is cylindrical in shape, with notches 21d formed at a plurality of locations along the axial direction of resonator 11, and the interior surface is conical and tapered toward the tip end. Afterpart 21b has a thread channel formed in the interior surface, and flange 21c is fastened to base 13 via a screw.

The forepart 22a of supplemental connector 22 is conical and slightly tapered toward the tip, and a thread ridge is formed on the exterior surface of afterpart 22b. The forepart 22a of supplemental connector 22 expands forepart 21a of connector 21 by screwing supplemental connector 22 deeply into connector 21. In this way pressure is applied to the interior surface of the base end of resonator 11, such that resonator 11 is fixedly attached to base 13 via both the interior and exterior surfaces.

As shown in FIGS. 11(a)-(d), movement of the base end of resonator 11 relative to the base 13 is completely prevented by hard-fastening the base 13 and resonator 11. Accordingly, there is no concern about reducing the oscillation of the tip of resonator 11, and there is no loss of oscillation energy between the base 13 and resonator 11. Furthermore, the interior surface of the base end of resonator 11 may be formed as a quadrangular column with the connector 13a having a complementary shape so as to increase the reliability of the connection in the same manner as in the attachment of reflecting mirror 12.

Figure 13:
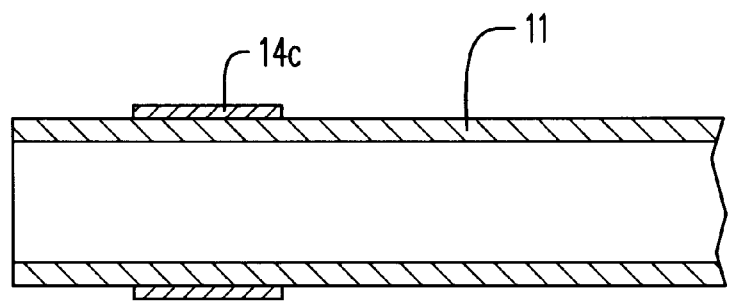
FIG. 13 is a section view showing the connection of the resonator and oscillator.

FIG. 13 shows a transverse section of the connection position of resonator 11 and oscillators 14a and 14b. Oscillators 14a and 14b are not shown in the drawing, but are integratedly formed with ring 14c, and are disposed in front and back directions relative to the drawing surface. Ring 14c has an interior surface which is slightly smaller than the major diameter of resonator 11 at room temperature, and is fixedly attached to the exterior surface of resonator 11 so as to tighten on resonator 11 from the outside. Ring 14c expands when heated, so as to increase the internal diameter of the ring to allow resonator 11 to pass therethrough, then contracts when cooled to room temperature, thereby connecting both components.

When the tube-like resonator 11 is provided with a through hole for oscillators 14a and 14b, the strength of the resonator is reduced at the location of the hole, and a subsequent loss of durability is incurred, but this disadvantage is avoided when the oscillators 14a and 14b are integratedly formed with the ring 14c so as to be fixedly attached to the exterior surface of resonator 11. When resonator 11 is tapered from the base end to the tip, both components can be connected by press-fitting resonator 11 into ring 14c from the tip end thereof. Furthermore, these components may be adhered using an adhesive. A protrusion may be formed on the interior surface of ring 14c for accurate connection. In this instance, the size and shape of the protrusion are set so as not to reduce strength by cutting the carbon fiber.

FIG. 14 is an external view of resonant optical device 5 of a fifth embodiment. Resonant optical device 5 does not mount oscillators 14a and 14b on resonator 11 as in each of the previously described embodiments of the resonant optical device, but rather mounts an oscillating unit 19 between base 13 and the tube-like resonator 11 formed of CFRP, and further provides an oscillator 14 mounted on the oscillating unit 19 so as to oscillate the oscillating unit 19 via the oscillator 14, said oscillation being transmitted to resonator 11 to accomplish resonance.

FIG. 15 is a section view of the resonator from the oscillating unit 19 to the reflecting mirror 12. Oscillating unit 19 is formed of metal such as iron or the like, and its interior is not hollow. A through hole 19a is provided through oscillating unit 19, through which the oscillator 14 formed of magnetic material is passed and fixedly attached. There is no concern of reduced strength caused by forming the through hole 19a since the oscillating unit 19 is dense and the exterior surface of oscillator 14 is in direct contact along the entirety of the through hole 19a.

Reflecting mirror 12 is provided with a connector 12a, and is press fitted into a channel formed in connector 12a and fixedly attached thereto. Connector 12a is connected to the tip of resonator 11 via the method shown in the aforesaid FIG. 8(b), but may similarly be connected via the methods previously mentioned in FIGS. 8(a) and 8(c). Oscillating unit 19 has a quadrangular columnar protrusion formed on the back end forming a connector 19b, and a concavity of complementary configuration is formed on base 13 such that both said protrusion and concavity engage to fixedly mount oscillating unit 19 on base 13. Since oscillating unit 19 is dense and has high strength, it also may be fixedly attached to the base by other methods such as fastening with screws or the like.

The connection of resonator 11 and oscillating unit 19 is described below. FIG. 16 shows an exterior view of resonator 11 and oscillating unit 19 prior to connection, and FIG. 17 shows examples of a cross section of both components in the connected state. In these examples, the interior surface of the base end of resonator 11 is formed as a multi-sided cross section, and a protrusion 19c is formed on the forepart of oscillating unit 19, such that both components are connected and attached by adhesive.

Figure 16A:
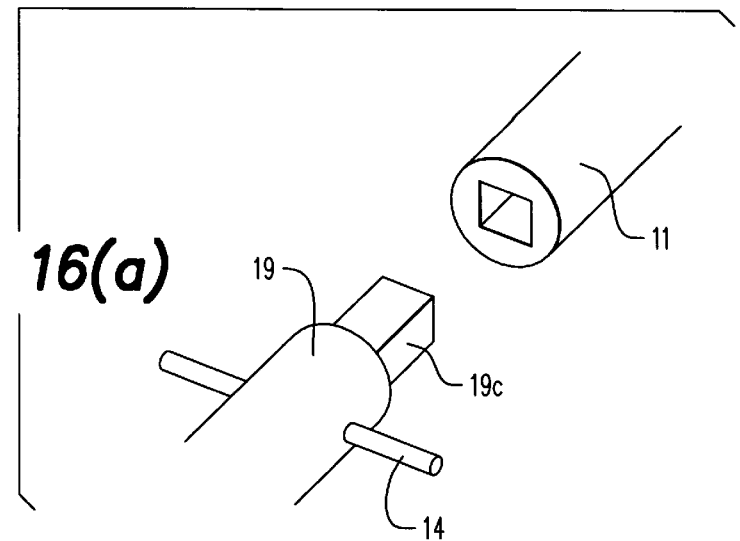
FIGS. 16a–16c a perspective view showing an example of the connection of the resonator and oscillator.
Figure 16B:
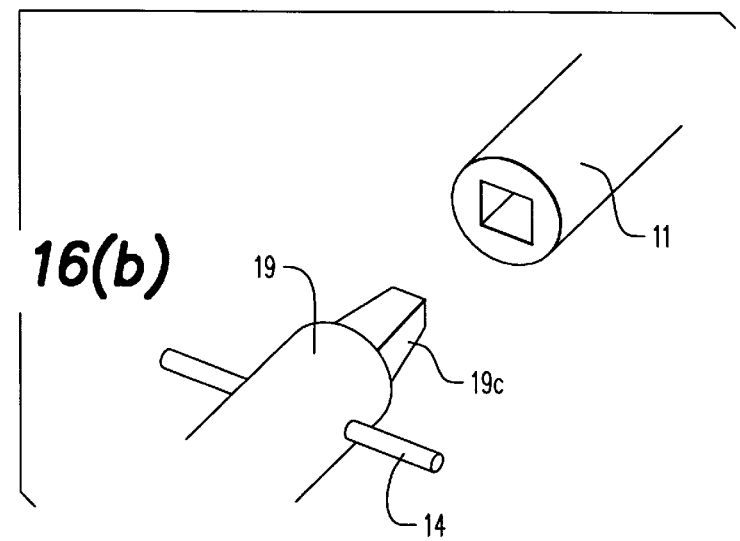
Figure 17A:
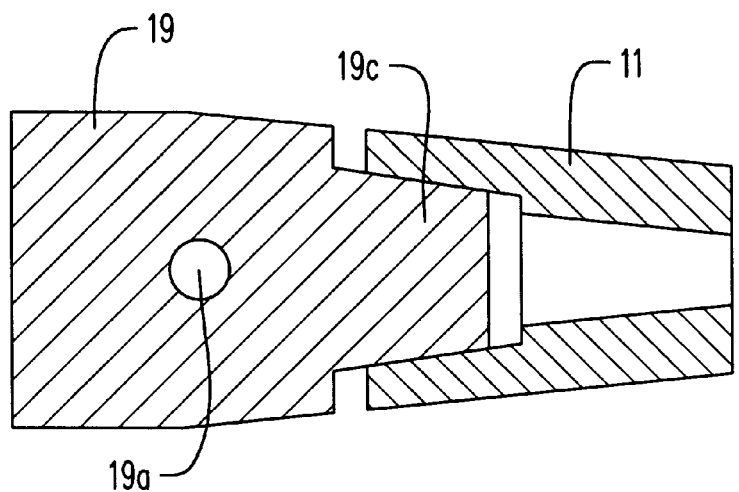
FIGS. 17a and 17b are a section view showing an example of the connection of the resonator and oscillator.

FIG. 16(a) shows connector 19c formed as a quadrangular column, and resonator 11 has an identical or slightly larger interior surface than connector 19. FIG. 16(b) shows connector 19c formed as a quadrangular pyramid with the interior surface of resonator 11 provided with a complementary shape having the same inclination. FIG. 17(a) shows a section view of the connection. The tip of connector 19c is smaller than the opening of the base end of resonator 11, and the base of connector 19c is slightly larger than the opening of the base end of resonator 11, such that connector 19c is inserted into the base end of resonator 11 and the exterior surface of connector 19c closely adhered to the interior surface of resonator 11. Consequently, connector 19c and resonator 11 are strongly attached without difficulty even if there are manufacturing errors in the size of the interior surface of the base end of resonator 11 and connector 19c.

Figure 16C:
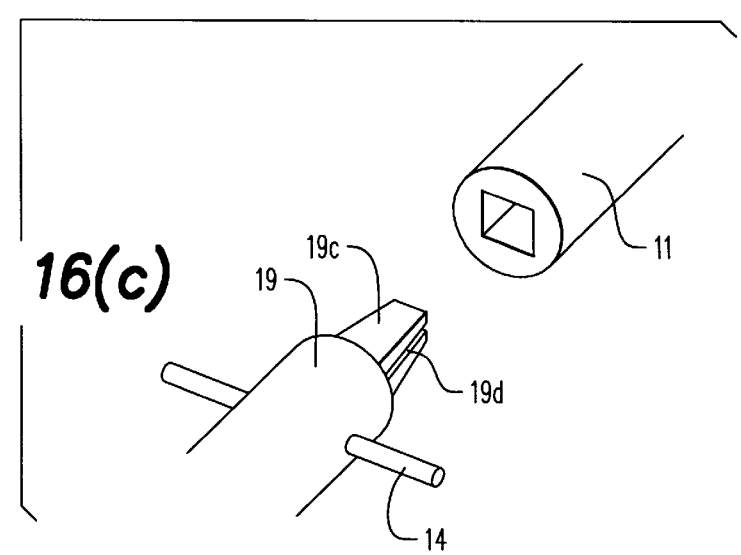
Figure 17B:
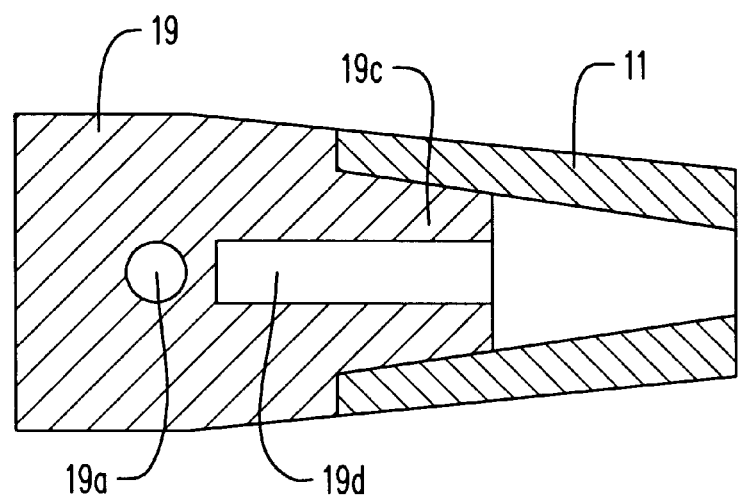

FIG. 16(c) shows connector 19c formed as a quadrangular pyramid with the interior surface of resonator 11 formed in a complementary shape slightly smaller than connector 19c, and connector 19c is provided with a deep channel 19d along the center axis of resonator 11. FIG. 17(b) shows a section view of the connection. The interior surface of the base end of resonator 11 sandwiches connector 19c from above and below, so as to strongly attach both components. Although channel 19d is shown in a horizontal direction, it is to be noted that said channel also may be formed in a perpendicular direction.

The oscillation of oscillating unit 19 is transmitted to resonator 11 without loss of oscillation by connecting oscillating unit 19 to resonator 11 in the aforesaid manner. It is particularly desirable to provide a channel 19d as shown in FIGS. 16(c) and 17(b), so as to make oscillator 19 more light in weight and allow oscillation using less energy.

Figure 18A:
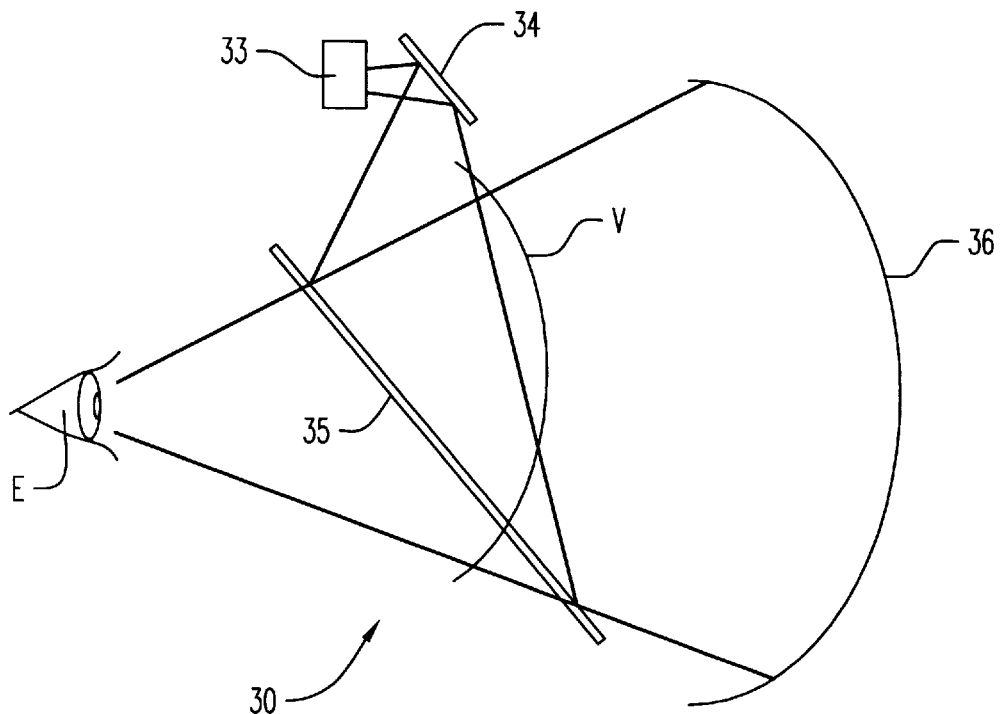
FIGS. 18a and 18b schematically illustrates the construction of a head-mounted display of the scanning type using the resonant optical device of the present invention.
Figure 18B:
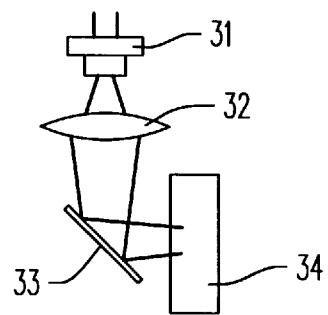

The resonant optical device of the present invention applied to a scanning type head-mounted display (HMD) is shown in FIG. 18. FIG. 18(a) is a side view generally showing the construction of HMD 30, and FIG. 18(b) is a top view of part of HMD 30. HMD 30 comprises laser 31, condenser lens 32, main scanner 33, sub scanner 34, half mirror 35, concave mirror 36, and a controller not shown in the drawing.

Laser 31 emits a laser beam in the visible light range, and main scanner 33 scans this laser beam in a horizontal direction relative to the eye E of an observer. Sub scanner 34 scans the laser beam scanned by main scanner 33 in a direction perpendicular to the eye E of an observer. Half mirror 35 reflects the laser beam from sub scanner 34 toward concave mirror 36, and the reflected light from concave mirror 36 is directed to eye E of the observer. The laser light emitted from laser 31 and advancing through the aforesaid optical path is focused by condenser lens 32 on the retina of the eye E of the observer to form an image.

The controller modulates the light emitted from laser 31 based on image signals, and forms a two-dimensional projection image on the retina of eye E of an observer by synchronizing the modulation and scanning via main scanner 33 and sub scanner 34. In this way an observer views a projected image V in a forward direction.

Main scanner 33 must scan at a frequency equal to or higher than approximately several tens of kHz in order to provide a high quality image at high resolution without flickering, and desirably has a scanning angle equal to or greater than approximately 10° to provide a wide angle image. Resonant optical devices 1, 4, and 5 of the first, fourth and fifth embodiments satisfy these requirements, and one of these devices may be used as the main scanner 33 of the HMD 30. When the scanning frequency is higher, the resonant optical devices 2 and 3 of the second and third embodiments may be used.

Sub scanner 34 desirably has a scanning angle approximately the same as the main scanner 33, but the scanning frequency may be approximately 1/200 of main scanner 33. This condition is satisfied even by the conventional resonant optical device of FIG. 19, but resonant optical devices 1, 4, and 5 may be used. Resonant optical devices 1, 4, and 5 are light weight compared to a conventional device, and are more desirable as a body-mounted display.

HMD 30 has various uses in the field of projected images, but its high speed and wide range are particularly suitable for animation having a high sense of reality such as virtual reality and flight simulations.

The resonant optical device which meets the criterion $G/\rho \geq 12 \times 10^6 \text{ Pa·kg}^{-1} \cdot \text{m}^3$ is capable of optical scanning at high speed by increasing the natural frequency of the resonator. Since a reduction of the amplitude limit is avoided in conjunction with the increase in natural frequency, it is possible to achieve both high speed scanning and wide range scanning. Furthermore, the overall device is more compact and lighter in weight because the resonator need not be thick to increase the natural frequency.

The resonant optical device in which $\tau/G \geq 0.001$ provides larger oscillation movement of the resonator to optically scan a wide range. Since the amplitude limit can be increased without producing a reduction in the natural frequency, it is possible to both scan at high speed and scan a wide range. Furthermore, the overall device is more compact and lighter in weight because the resonator need not be long to increase the amplitude limit.

The resonant optical devices made of fiber-reinforced resin are more compact and extremely lightweight and allow scanning at high speed and scanning a wide range. Accordingly, these devices are suitable for use as the scanning units of scanning type head-mounted displays. These devices also provide high durability.

What is claimed is:

1. A resonant optical device comprising a rod-like resonator for resonant vibration, a reflecting mirror supported on one edge of said resonator, a drive unit for oscillating said resonator in a circumferential direction, and a stationary platform to which the other edge of said resonator is anchored, such that torsional oscillation produced by resonance of said resonator via said drive unit causes said reflecting mirror to oscillate so as to scan incident light on said reflecting mirror, wherein said resonator satisfies the expression $$G/\rho \geq 12 \times 10^6 \text{ Pa·kg}^{-1} \cdot \text{m}^3$$

where the horizontal elastic modulus of the resonator is designated G, and the density is designated ρ.

2. The resonant optical device claimed in claim 1, wherein said resonator is a torsion spring reinforced in the circumferential direction by fibers formed of fiber-reinforced resin.

3. The resonant optical device claimed in claim 2, wherein said fiber-reinforced resin is a carbon fiber-reinforced resin.

4. A resonant optical device comprising a rod-like resonator for resonant vibration, a reflecting mirror supported on one edge of said resonator, a drive unit for oscillating said resonator in a circumferential direction, and a stationary platform to which the other edge of said resonator is anchored, such that torsional oscillation produced by resonance of said resonator via said drive unit causes said reflecting mirror to oscillate so as to scan incident light on said reflecting mirror, wherein said resonator satisfies the expression $$\tau/G \geq 0.01$$

where the horizontal elastic modulus of the resonator is designated G, and the torsional stress tolerance is designated τ.

5. The resonant optical device claimed in claim 4, wherein said resonator is a torsion spring reinforced in the circumferential direction by fibers formed of fiber-reinforced resin.

6. The resonant optical device claimed in claim 5, wherein said fiber-reinforced resin is a carbon fiber-reinforced resin.

7. A resonant optical device comprising a rod-like resonator comprising a torsion spring reinforced in the circumferential direction by fibers formed of fiber-reinforced resin for resonant vibration, a reflecting mirror supported on one end of said resonator, a drive unit for oscillating said resonator in a circumferential direction, and a stationary platform to which the other end of said resonator is anchored, such that torsional oscillation produced by resonance of said resonator via said drive unit causes said reflecting mirror to oscillate so as to scan incident light on said reflecting mirror.

8. The resonant optical device claimed in claim 7, wherein said fiber-reinforced resin is a carbon fiber-reinforced resin.

9. The resonant optical device of claim 7 wherein said rod-like resonator has a hollow interior.

10. The resonant optical device of claim 9 further including a member which protrudes from said stationary platform and is fitted into said hollow interior at said other end of said rod-like resonator, to anchor said resonator to said platform.

11. The resonant optical device of claim 10 wherein said protruding member is connected to the interior of said resonator by means of adhesive.

12. The resonant optical device of claim 10 wherein said protruding member has a larger outer circumference than the inner circumference of said resonator, to form a friction fit between said protruding member and said resonator.

13. The resonant optical device of claim 10 further including a compression ring on the exterior of said resonator adjacent said other end, for pressing said resonator into engagement with said protruding member.

14. The resonant optical device of claim 9, wherein said platform has a through-hole in which said rod-like resonator is disposed to project from one side thereof, and further including a connecting member which is disposed in the hollow interior of said resonator to expand said resonator outwardly into friction engagement with said platform.

15. The resonant optical device of claim 9 wherein said drive unit includes rods made of a magnetic material which project from said resonator, and a ring disposed on the exterior of said resonator and upon which said rods are mounted.

16. The resonant optical device of claim 9 wherein said drive unit includes a member made of magnetic material that is disposed between said resonator and said stationary platform, and a rod of magnetic material disposed in a through-hole in said member and projecting therefrom on opposite sides of said member.

17. The resonant optical device of claim 16, wherein said member has a solid interior.

18. The resonant optical device of claim 16 wherein said member includes a quadrangular column which projects from one end thereof and which is disposed in the hollow interior of said resonator for connecting said resonator to said member.

19. The resonant optical device of claim 16 wherein said member includes a quadrangular pyramid which projects from one end thereof and which is disposed in the hollow interior of said resonator for connecting said resonator to said member.

20. The resonant optical device of claim 19 wherein the hollow interior of said resonator has a shape which is complementary to, but smaller than, said quadrangular pyramid, and said quadrangular pyramid has a channel parallel to the longitudinal axis of said resonator to accommodate a press fit between said resonator and said quadrangular pyramid.

21. The resonant optical device of claim 9 wherein said resonator has the shape of a quadrangular column.

22. The resonant optical device of claim 9 wherein said resonator comprises overlapping spiral layers of fiber that are oriented in directions which are transverse to the circumferential direction of said resonator.

23. The resonant optical device of claim 22 wherein the fibers in said layers are respectively oriented at angles of plus and minus 45° relative to said circumferential direction.

24. The resonant optical device of claim 9 further including a connector disposed within the hollow interior of said resonator at said one edge, for supporting said mirror.

25. The resonant optical device of claim 24, wherein said connector is attached to said resonator by means of an adhesive.

26. The resonant optical device of claim 24, wherein said connector is attached to said resonator by means of a friction fit between the interior surface of said resonator and said connector.

27. The resonant optical device of claim 24, further including a compression ring on the exterior of said resonator adjacent said one end, for pressing said resonator into engagement with said connector.

28. The resonant optical device of claim 7, wherein said mirror is mounted on an exterior surface of said resonator at said one end, and has a back surface which is complementary to said exterior surface of said resonator.

29. The resonant optical device of claim 28, wherein said mirror is attached to said exterior surface by means of an adhesive.

30. The resonant optical device of claim 28, further including a collar which is attached to opposite sides of said mirror and circumscribes said resonator to attach said mirror thereto.

31. The resonant optical device of claim 7 wherein said mirror comprises a mixture of crystallized glass and amorphous glass having a reflective coating on one surface thereof.

32. A resonant optical device, comprising:

first and second rod-like resonators spaced from one another along a common longitudinal axis;

a reflecting mirror supported at opposing, adjacent ends of said first and second rod-like resonators in the space between them;

a stationary platform supporting said rod-like resonators at the other end of each resonator; and a drive unit for oscillating said resonators in a circumferential direction such that torsional oscillation produced by resonance of said resonators via said drive unit causes said reflecting mirror to oscillate so as to scan incident light on said reflecting mirror.

33. The resonant optical device of claim 32 wherein said rod-like resonators each comprise a torsion spring that is reinforced in the circumferential direction by fibers formed of fiber-reinforced resin.

34. The resonant optical device of claim 33 wherein said fiber-reinforced resin is a carbon fiber-reinforced resin.

35. The resonant optical device of claim 32 wherein said drive unit comprises a permanent magnet for magnetizing said mirror, and a pair of coils displaced from one another in a direction perpendicular to said longitudinal axis for exerting torsional faces on said mirror.

36. The resonant optical device of claim 35 wherein said permanent magnet is disposed on said stationary platform, and said resonators form a conductive path from said magnet to said mirror, to magnetize said mirror.

* * * * *